(12) United States Patent
Camilleri et al.

(10) Patent No.: US 8,868,070 B2
(45) Date of Patent: Oct. 21, 2014

(54) METHOD OF AND ARCHITECTURE FOR A VIRTUAL WIRELESS NETWORK

(75) Inventors: Michael Camilleri, Berkshire (GB); Jose Luis Merino Gonzalez, Malaga (ES)

(73) Assignee: Shoo 533 Limited, Buckinghamshire (GB)

( * ) Notice: Subject to any disclaimer, the term of this patent is extended or adjusted under 35 U.S.C. 154(b) by 1003 days.

(21) Appl. No.: 12/281,853

(22) PCT Filed: Mar. 16, 2007

(86) PCT No.: PCT/GB2007/000929
§ 371 (c)(1),
(2), (4) Date: Feb. 9, 2009

(87) PCT Pub. No.: WO2007/105000
PCT Pub. Date: Sep. 20, 2007

(65) Prior Publication Data
US 2009/0227230 A1 Sep. 10, 2009

(30) Foreign Application Priority Data
Mar. 16, 2006 (GB) .................................. 0605283.1

(51) Int. Cl.
*H04W 4/00* (2009.01)
*H04W 8/26* (2009.01)
*H04W 8/04* (2009.01)
(52) U.S. Cl.
CPC . *H04W 8/04* (2013.01); *H04W 8/26* (2013.01)
USPC ........ 455/433; 455/412.2; 455/410; 455/411; 455/414.1

(58) Field of Classification Search
CPC ...... H04W 4/001; H04W 8/02; H04L 67/306; H04L 63/0272
USPC ...................... 455/415, 412.2, 418; 379/142.01–142.18, 245–249, 120
See application file for complete search history.

(56) References Cited

U.S. PATENT DOCUMENTS

| 6,738,622 | B1 * | 5/2004 | Standelmann et al. ..... 455/435.1 |
| 2003/0139180 | A1 * | 7/2003 | McIntosh et al. ............. 455/426 |
| 2003/0171119 | A1 * | 9/2003 | McIntosh ...................... 455/445 |
| 2005/0074014 | A1 * | 4/2005 | Rao et al. .................. 370/395.53 |

FOREIGN PATENT DOCUMENTS

| CA | 2 265 560 C | 1/2006 |
| FR | 2 790 161 | 8/2000 |
| FR | 2 814 030 | 3/2002 |

(Continued)

OTHER PUBLICATIONS

International Search Report issued in priority application No. PCT/GB2007/000929.

(Continued)

*Primary Examiner* — Kiet Doan
*Assistant Examiner* — Dung Lam
(74) *Attorney, Agent, or Firm* — Saul Ewing LLP

(57) ABSTRACT

A virtual wireless network including a server running a home location register (HLR), the home location register being associated solely with a virtual wireless network operator that does not have any licensed frequency spectrum, but provides wireless services to a subscriber by using the wireless basestations of a wireless network operator that does have licensed frequency spectrum.

21 Claims, 8 Drawing Sheets

(56) References Cited

FOREIGN PATENT DOCUMENTS

| GB | 2 280 085 | 1/1995 |
| WO | WO 98/10614 | 3/1998 |
| WO | WO 99/55107 | 10/1999 |

OTHER PUBLICATIONS

International Preliminary Report on Patentability, dated Sep. 16, 2008, and Written Opinion, issued in corresponding International Application No. PCT/GB2007/000929.

* cited by examiner

METHOD OF AND ARCHITECTURE FOR A VIRTUAL WIRELESS NETWORK

CROSS REFERENCE TO RELATED APPLICATIONS

This application claims the priority of PCT/GB2007/000929 filed on Mar. 16, 2007, which claims priority to GB 0605283, filed Mar. 16, 2006, the entire contents of which are hereby incorporated herein by reference.

FIELD OF THE INVENTION

This invention relates in general terms to virtual wireless networks. It relates in particular to a method of, and architectures for, virtual wireless networks interfacing and interconnecting with wireless networks and public access networks. In- and out-going, voice and data calls can be handled. It relates also to interfacing and connecting wireless devices to both virtual and non-virtual wireless networks for in- and out-going SMS, voice and data call routing.

BACKGROUND OF THE INVENTION

Wireless devices can now handle voice and/or data, allowing simplex and/or duplex voice calls, video calls, text messaging, internet browsing. Some wireless communication devices can now also handle voice-over-internet-protocol (VoIP) calls, and others are able to handle multimedia (voice, video, graphics) calls through wireless networks and/or through wireless networks connected to the internet or media servers.

A wireless network operator owns and maintains physical basestations and has licensed frequency spectrum: these are defining properties of a wireless network operator. A 'virtual wireless network operator' in contrast has no physical basestations. A 'virtual wireless network' (sometimes called a 'virtual network') operates with a simple commercial agreement with a wireless network operator; virtual networks operate in the home country of the wireless network that they have an agreement with, basically making use of the Home Location Register (HLR), the billing system and the radio infrastructure of the wireless network but retaining the ability to bill their own customers directly. A Home Location Register (HLR) is a database owned and maintained by a network operator.

Different types of calls, initiated by wireless devices can be restricted for some or most outgoing traffic types; for example, voice and data calls, as well as internet web browsing, can be restricted by the call tariffs made available by the wireless network that is subscribed to. These wireless networks could be operated by a traditional wireless network operator or a virtual network operator. The restrictions can even limit which web servers the user is actually allowed to access; in most or all cases the restrictions will limit the users in their home country to only one wireless network, i.e. the home wireless network to which the user is subscribed to or its associated virtual wireless network.

What is needed is a method that gives users, in particular those users of wireless devices subscribed to a specific wireless network or virtual wireless network in their home country, a choice of the call set-up route(s), and also gives a choice of viewing any desired web server or web-page, and also users to initiate outgoing calls at the tariff of their choice and through any of the wireless network(s) available in their home country (as well as abroad when roaming outside of their home country).

With existing systems however, this is very difficult because mobile network operators have little economic incentive to provide end-users with the freedom to choose the cheapest network for each call set-up route for any outgoing traffic, such as outgoing-SMS, -voice call, -data call. In fact, they have every economic incentive to make this very difficult. One mechanism that entrenches the network operators' ability to restrict such freedom is the fact that every network operator in effect has considerable control over each subscriber because each subscriber with a particular network operator has to be registered in the home location register (HLR) of that operator in order to receive service. The ownership and control that a network operator has over its HLR constitutes a major entry barrier to competitors, especially virtual wireless network operators, seeking to offer lower cost services, Before summarising the invention, we will explain some background terms.

A Home Location Register (HLR) is a database that is, conventionally, owned and maintained by a wireless network operator. It contains mobile subscriber information for all subscribers to that operator. HLR subscriber information includes the International Mobile Subscriber Identity (IMSI), service subscription information, location information (the identity of the currently serving Visitor Location Register (VLR) to enable the routing of mobile-terminated calls), service restrictions and supplementary services information. The HLR also initiates transactions with VLRs to complete incoming calls and to update subscriber data.

The IMSI is a unique non-dialable number allocated to each mobile subscriber that identifies the subscriber and his or her operator subscription. The IMSI is stored in the Subscriber Identity Module (SIM). The IMSI is made up of three parts: (1) the mobile country code (MCC) consisting of three digits, (2) the Mobile Network Code (MNC) consisting of two digits, and (3) the Mobile Subscriber Identity Number (MSIN) with up to 10 digits.

A Visitor Location Register (VLR) is a database owned and maintained by a wireless mobile operator. It contains temporary information about mobile subscribers that are currently located in a geographic area served by that mobile operator, but whose Home Location Register (HLR) is elsewhere.

When a mobile subscriber roams away from his home location and into a remote location (typically to a different country), SS7 messages are used to obtain information about the subscriber from the HLR, and to create a temporary record for the subscriber in the VLR. There is usually one VLR per operator. The VLR automatically updates the HLR with the new location information, which it does using an SS7 Location Update Request Message. The Location Update Message is routed to the HLR through the SS7 network, based on the global title translation of the IMSI that is stored within the SCCP Called Party Address portion of the message. The HLR responds with a message that informs the VLR whether the subscriber should be provided service in the new location.

The following acronyms are used in this specification:

| | |
|---|---|
| AuC | Authentication Centre |
| EIR | Equipment Identity Register |
| GMSCS | Gateway Mobile Switching Centre Switch |
| HLR | Home Location Register |
| HLRvn | Home Location Register of a virtual network |
| IF_B | Wireless Device interface |
| IF_C | Public Access Network interface |
| IF_D | Home Location Register interface |
| IF_F | Services Mobile Switching Centre Switch interface |
| IF-A | GMSCS to SMSCS interface |

-continued

| | |
|---|---|
| IF-E | Media Gateway interface |
| IMSI | International Mobile Subscriber Identity |
| IN | Intelligent Network sub-module |
| LHWN | Local Home Wireless Network |
| MG | Media Gateway |
| MSC | Mobile Switching Centre |
| PAN | Public Access Network |
| PREPOS | Billing and services management for pre and post paid end-users |
| PSIM | Proprietary SIM (includes multiple SIM sub-modules; e.g. a local SIM sub-module and a roaming SIM sub-module, with different IMSI) |
| RAN | Radio Access Network |
| RHWN | Roaming Home Wireless Network |
| SIM | Subscriber Identity Module |
| SIML | Local SIM |
| SIMR | Roaming SIM |
| SMSCS | Services Mobile Switching Centre Switch |
| VN | Virtual Wireless Network |
| WD | Wireless Device |
| WDvn | Wireless Device using the HLR of a VN |
| WN | Wireless Network |

SUMMARY OF THE INVENTION

A first aspect of the invention is an apparatus forming part of a virtual wireless network, the apparatus including a server running a home location register (HLR), the home location register being associated solely with a virtual wireless network operator that does not have any licensed frequency spectrum, but provides wireless services to a subscriber by using the wireless basestations of a wireless network operator that does have licensed frequency spectrum.

Where the subscriber operates a wireless device with two or more IMSIs, then the apparatus can be operable to manage remotely the selection of an appropriate IMSI on the device, for example based lowest cost call routing or on features available when one particular IMSI is used and not another. The home location register itself may manage the remote selection of an appropriate IMSI on the device.

In an implementation, the apparatus includes one or more of the following:
 multiple home location registers.
 an equipment identity register sub-module.
 an authentication centre sub-module.
 a media gateway.
 an interface to a public access network.
 a billing and services management module for pre and post paid end-users.
 a gateway mobile switching centre switch.
 an interface to enable communication with the wireless network operator.
 an interface to enable communication with any incoming calling party; and any outgoing calling party registered with the home location register.
 an interface to enable communication using one or more of the following: wireless networks public access networks; and via one or more of the following: wireless interfaces and wired interfaces.

An implementation of the apparatus is typically adapted to receive communications from wireless devices that access the apparatus via the wireless basestations of the wireless network operator. It can be adapted to communicate with a services mobile switching centre switch operated by the wireless network operator.

It may also include a gateway mobile switching centre switch, adapted to communicate with the services mobile switching centre switch operated by the wireless network operator. The gateway mobile switching centre switch can communicate with the services mobile switching centre switch operated by the wireless network operator when the subscriber is in its home country.

The apparatus can also communicate with a services mobile switching centre switch operated by a roaming partner wireless network operator. The apparatus can include a gateway mobile switching centre switch to communicate with the services mobile switching centre switch operated by the roaming partner wireless network operator. The gateway mobile switching centre switch can interface with the services mobile switching centre switch of the roaming partner wireless network operator when the end-user user is not in its home country. The gateway mobile switching centre switch may also interface with the services mobile switching centre switch of the roaming partner wireless network operator when the end-user user is in its home country.

The home location register can communicate with a services mobile switching centre switch of the wireless network operator. The home location register can also communicate with the services mobile switching centre switch of a roaming partner wireless network operator when the user is not in its home country.

The subscriber to the virtual wireless network operator typically has a wireless device with a SIM that is registered to the home location register.

The apparatus can itself supply to a wireless device, indicative costs for a future call, in response to a request from a subscriber for that information. The indicative cost can include a saving or other price comparison for all available networks in response to a user inputting a destination number, to his wireless device.

The apparatus is also operable to determine the optimal routing of a call, involving any one or more of the following: wireless networks, fixed networks, servers and the internet.

The subscriber can determine which available wireless network is used to route an outgoing call from that subscriber.

The apparatus can be co-located with at least some of the physical infrastructure of the wireless network.

Another aspect is a mobile communications system, which includes the apparatus as defined above, when used in combination with subscriber wireless devices that each have two or more IMSI numbers. A wireless device can for example include multiple SIM sub-modules, such as a local SIM sub-module and a roaming SIM sub-module, each with a different IMSI. One SIM sub-module can be associated with the virtual wireless network operator and the other then associated with a wireless network operator. The wireless network operator can be the wireless network operator that is associated with the virtual wireless network operator. One SIM sub-module can be associated with the virtual wireless network operator and the other is then associated with a different virtual wireless network operator. Each virtual wireless network operator can be based in a different country.

Another approach is for the wireless device to include two separate SIMs, such as a local SIM and a roaming SIM, each with a different IMSI. One SIM can be associated with the virtual wireless network operator and the other is associated with a wireless network operator. The wireless network operator can be the wireless network operator that is associated with the virtual wireless network operator. One SIM can be associated with the virtual wireless network operator and the other is then associated with a different virtual wireless network operator. Each virtual wireless network operator can be based in a different country.

A subscriber can choose which SIM or SIM sub-module to use. Further, the apparatus that forms part of the virtual wireless network can also choose which SIM or SIM sub-module is used. The home location register itself may choose which SIM or SIM sub-module is used.

Another aspect is a method of routing calls from a wireless device, comprising the step of using an apparatus as defined above. A further aspect is a method of routing calls from a wireless device, comprising the step of using a system as defined above.

A final aspect is a wireless device when used in the system defined above, the wireless device operating with two or more IMSI numbers.

An implementation of the invention gives each wireless device user the freedom to choose the cheapest option for each call set-up route for any outgoing traffic (such as outgoing SMS, voice calls, data calls) and would thus allow virtual wireless networks to expand operations by entering a least two commercial agreements with wireless network operators in the same country or in two or more different countries. It would also allow a virtual wireless network operator to attract wireless device users in its home country and also in any country with whom any associated wireless network operators have a roaming agreement with.

In one implementation, there is a Virtual wireless Network (VN) in which the VN's Home Location Register (HLRvn) with its corresponding Equipment Identity Register (EIR) and Authentication Centre (AuC), identify and authorise each individual registered Wireless Device (WD) with a built-in valid Subscriber Identity Module (SIM), assigned to the HLR of the VN. The VN includes a billing and services management module for prepaid and optionally for postpaid endusers (PREPOS). Each individual registered Wireless Device (WD) is interconnected with the HLR; a Media Gateway (MG) has a digital interface (IF_E) and a VLR has a digital interface (IF_D). Both digital interfaces IF_D and IF_E are main interfaces from the VN towards the Wireless Network (WN), interconnecting with the Mobile Switching Centre (MSC) or, more particularly, with the Services MSC Switch (SMSCS). Alternatively, both digital interfaces IF_D and IF_E from the VN can be connected to a Gateway MSC Switch (GMSCS), if available, residing within the VN, which in turn will interface with the WN, interconnecting the GMSCS of the VN through a digital interface (IF_A) with the SMSCS of the WN.

For any outgoing call, the WD, meaning any wireless device that has a built in SIM assigned to the HLR of the VN (herein also referred to as a WDvn), first establishes data communication through the wireless interface (IF_B), then through the Radio Access Network (RAN) and the services SMSCS (both controlled by the WN), and then through the interface IF_A, IF_D or IF_E, respectively with the GMSCS, HLR or MG, all three of which are controlled by the VN. At first, the VN will confirm authentication and equipment identity registration and then the HLR will authorise such outgoing call initiated by the WD by recognising the SIM identification within the HLR's database (with it's corresponding services assignment and credit availability) and route the call through to the calling party, either through the interface IF_D and the VN's own GMSCS to the interface IF_C or IF_A depending where the calling party resides or though the interface IF_D and the WN's services MSC switch (SMSCS) to the interface IF_C or to the digital interface (IF_F) depending where the calling party resides.

When any $3^{rd}$ party (WD user from any WN, fixed network user or any other WDvn user) calls any of the WDvn registered on the VN, then such incoming call establishes communication through either the interface IF_B or IF_C (dependent on whether calling from a wireless network WN or a fixed network PAN), with the SMSCS of the WN. The SMSCS then in turn communicates with the GMSCS of the VN, if available, and then with the HLR of the VN. The SMSCS communicates directly with the HLR of the VN if the GMSCS is not available. The HLR will then confirm authentication and equipment identity registration of the WDvn the $3^{rd}$ party wishes to communicate with. The HLR authorises such incoming call to the corresponding WDvn by recognising the WDvn's SIM identification within the HLR's database with it's corresponding services assignment and credit availability.

DETAILED DESCRIPTION

Figure 1:
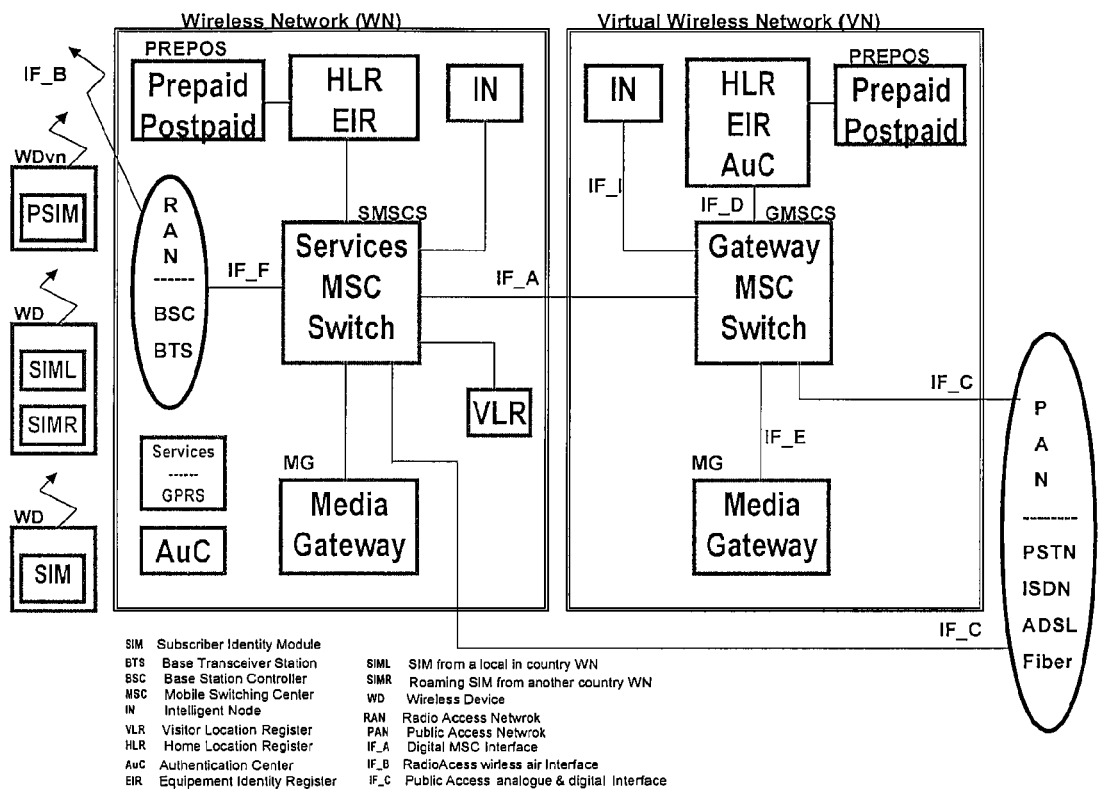
FIG. 1 is a block diagram and architecture of a communications system, and in particular of a virtual wireless network, with wireless devices communicating through a wireless interface to a wireless network(s) and a virtual wireless network, in accordance with the present invention.

Specifically, FIG. 1 is a block diagram of a wireless communications system, which can be used to implement an embodiment of the present invention. For this exemplary embodiment, there is shown a wireless device (WD), yet another wireless device (WDvn) with a built-in PSIM, a wireless network (WN) and a Virtual Wireless Network (VN), interconnected between each other.

Voice and data communication between the WD and the wireless network is through the wireless interface IF-B, which in turn allows connection to any communication device connected, by wire or wirelessly, to the wireless network. The entire system can therefore include, but is not limited to, a fixed network, an application server, a media server, a voice over IP network or even a different wireless network, or a multiple configuration of the previous; multiple wireless devices (WDvn), multiple wireless interfaces (IF-Bn), multiple wireless networks (WNn), multiple fixed networks through the public access network (PAN), multiple application servers, media servers, and multiple voice over IP networks.

Wireless device WDvn has an embedded PSIM. The WD is configured in accordance with a combination of technologies used in the field of handheld wireless devices and personal digital handheld wireless devices, such as (but not limited to) wireless phones, cellular phones, mobile phones, hand held radio frequency digital communication devices, personal digital assistants and so called smart-phones, which can communicate with the wireless networks as described.

Virtual wireless network VN is configured in accordance with a combination of technologies used in the field of wireless digital communications networks. It can include a Proprietary Sub-module with a Home Location Register virtual network (HLRvn) consisting of all or part or a combination or multiple of the following sub-modules:

Home Location Register (HLR), Sub-module:
Equipment Identity Register (EIR), Sub-module:
Authentication Centre (AuC), Sub-module:
VN can also include:
Intelligent Network (IN), Sub-module:
Prepaid and optionally Postpaid services and billing Centre (PREPOS), Sub-module:
Gateway "Mobile Switching Centre" Switch (GMSCS), Sub-module;
Media Gateway (MG).

The VN's Home Location Register (HLRvn), with its corresponding Equipment Identity Register (EIR) and Authentication Centre (AuC), identifies and authorises each individual registered Wireless Device (WD) with a built-in valid Subscriber Identity Module (SIM), assigned to the HLR of the VN. The VN and the billing and services management module for prepaid and optionally for postpaid end-users (PREPOS), is interconnected with the HLR. The Media Gateway (MG) has a digital interface (IF_E) and the VLR has a digital interface (IF_D). Both digital interfaces IF_D and IF_E are main interfaces from the VN towards the Wireless Network's (WN) interconnection with the Mobile Switching Centre (MSC) or more the Services MSC Switch (SMSCS). Alternatively, both digital interfaces IF_D and IF_E from the VN can be connected to a Gateway MSC Switch (GMSCS), if available, residing within the VN, which in turn will interface with the WN, interconnecting the GMSCS of the VN through a digital interface (IF_A) with the SMSCS of the WN.

The WD (meaning any wireless device that has a built-in SIM assigned to the HLR of the VN), also referred to as WDvn in this specification, initially establishes, for any outgoing call, data communication through the wireless interface (IF_B) and through the Radio Access Network (RAN) and the services SMSCS, the latter two items both belonging to the WN. From there, it communicates though the interface IF_A, IF_D or IF_E, to the GMSCS, HLR or MG, (with all three of the GMSCS, HLR or MG belonging to the VN).

As a first step, the VN will confirm authentication and equipment identity registration and then the HLR will authorise such outgoing call initiated by the WD by recognising the SIM identification within the HLR's database and it's corresponding services assignment and credit availability. The VN will then route the call through to the calling party, either:

through the interface IF_D and the VN's own GMSCS to the interface IF_C or IF_A, depending where the calling party resides. IF_C routes the call onto the PAN and hence may be very suitable for a long distance connection or if the recipient has no mobile telephone. IF_A is especially suitable where the recipient has a mobile telephone on the same network as the caller and is in the same country. Or though the interface IF_D and the WN's services MSC switch (SMSCS) to the interface IF_C or to the digital interface (IF_F) depending where the calling party resides.

When any $3^{rd}$ party (WD user from any WN, fixed network user or any other WDvn user) calls any of the WDvn registered on the VN, then such incoming call establishes communication with the SMSCS of the WN through either the interface IF_B when calling from a wireless network WN or interface IF_C when calling from a fixed network PAN. The SMSCS then in turn communicates with the GMSCS of the VN, if available, and then with the HLR of the VN or otherwise directly with the HLR of the VN. The HLR then will confirm authentication and equipment identity registration of the WDvn the $3^{rd}$ party wishes to communicate with. The HLR authorises such incoming call to the corresponding WDvn by recognising the WDvn's SIM identification within the HLR's database with it's corresponding services assignment and credit availability.

Figure 2:
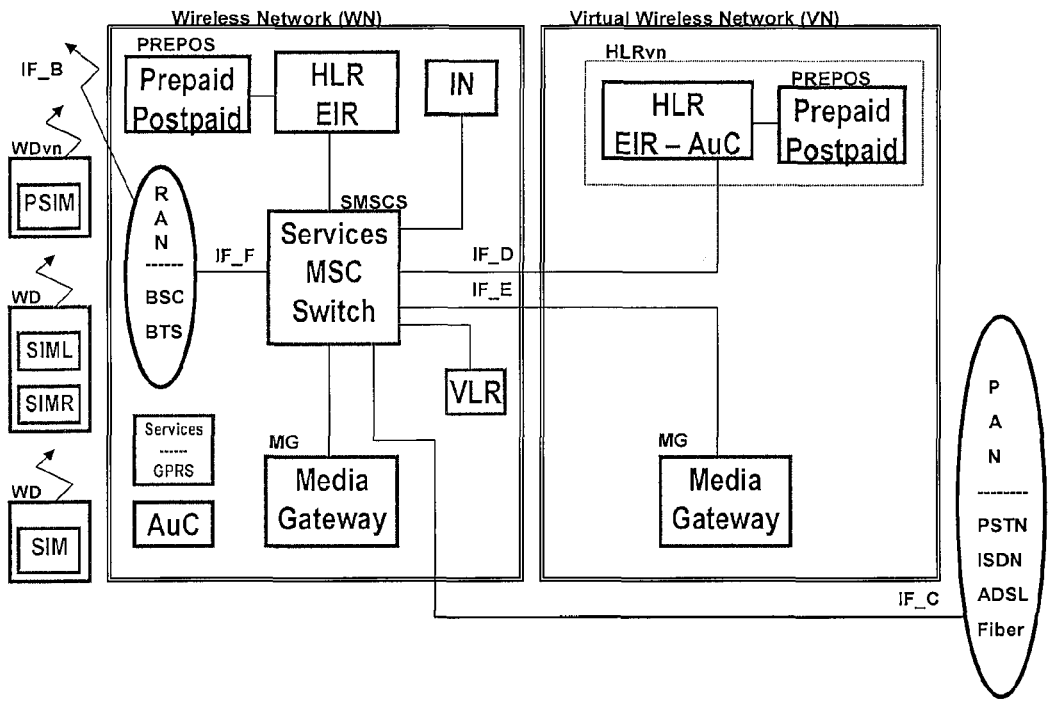
FIGS. 2 and 3 show two example implementations of the present invention showing the wireless virtual network (VN) and in particular the proprietary home location register of the virtual network (HLRvn), capable of managing one, two or more IMSIs associated with the proprietary subscriber identity module (PSIM) and wireless devices (WD) and (WDvn) associated with such VN, both with and without a built in PSIM.
Figure 3:
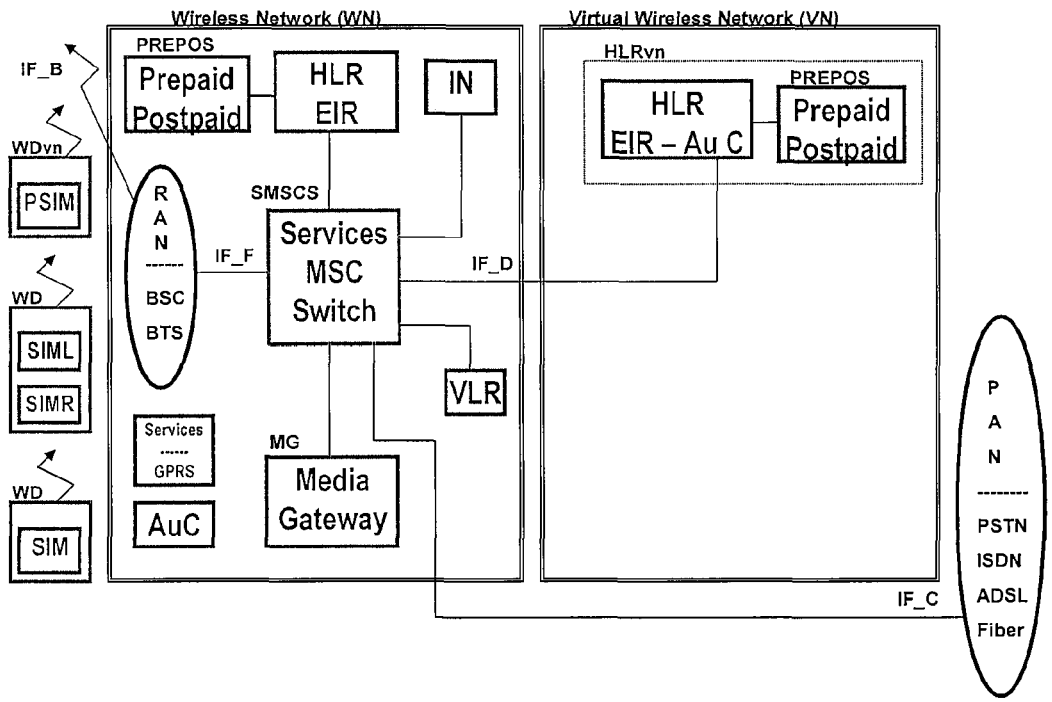
Figure 4:
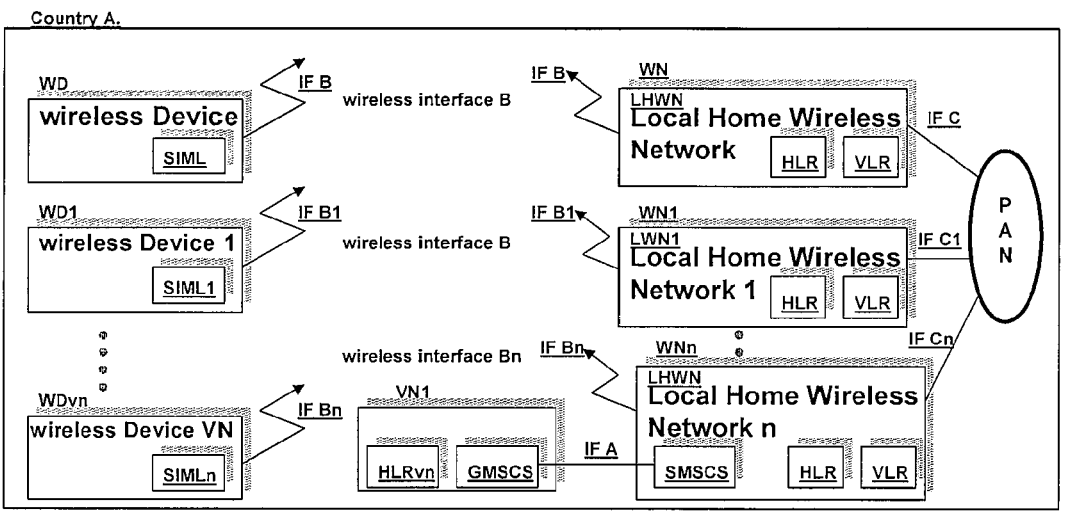
FIGS. 4 to 13 are example implementations of the present invention showing the different wireless virtual network (VN) architectures, including the proprietary home location register of the virtual network (HLRvn) and wireless devices (WD) and (WDvn) associated with such VN, both with and without a built in proprietary subscriber identity module (PSIM). The VN can be located in the same country as the WN to which the VN interconnects with or in a different country. The WDvn can be located in the same country as the VN or WN to which it is associated with, or in a different country than the country where the VN or WN to which it is associated with is located.
Figure 5:
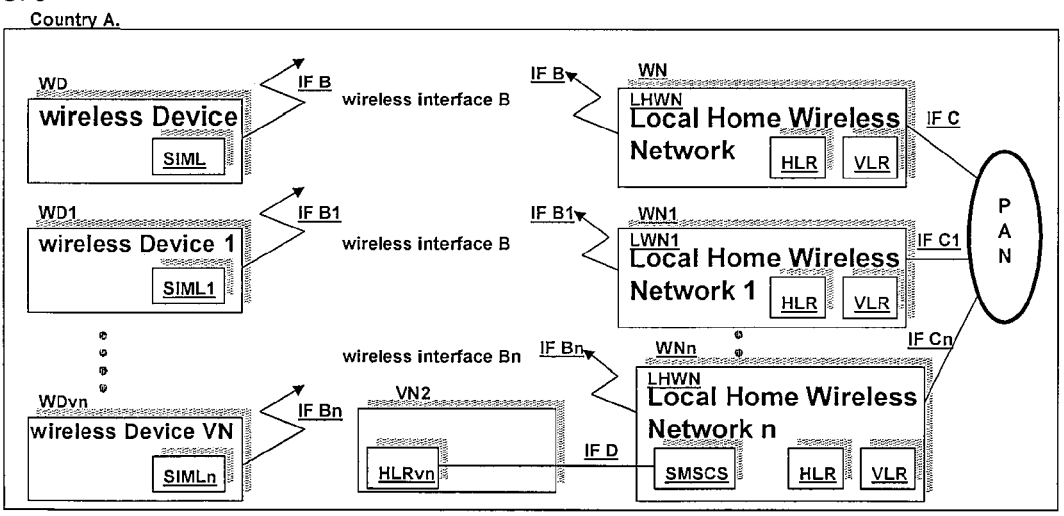
Figure 6:
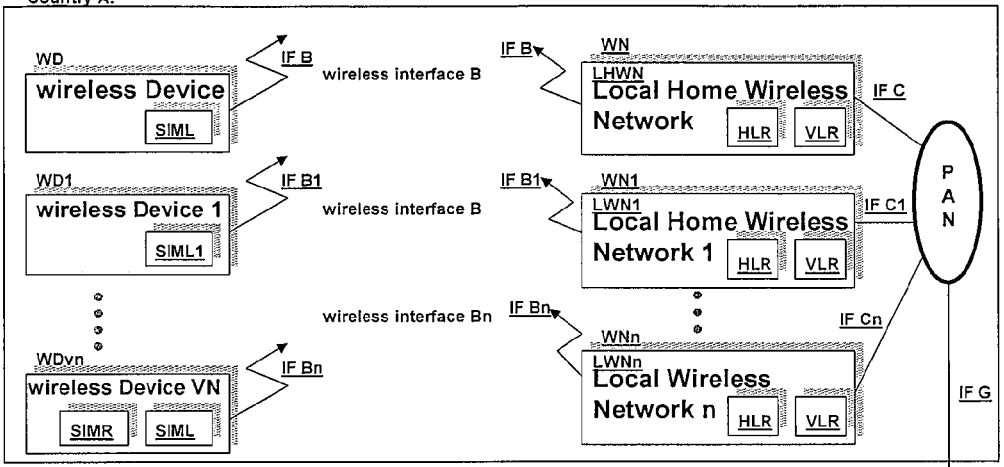
Figure 6:
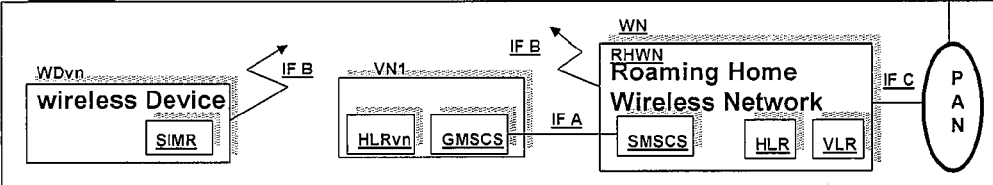
Figure 7:
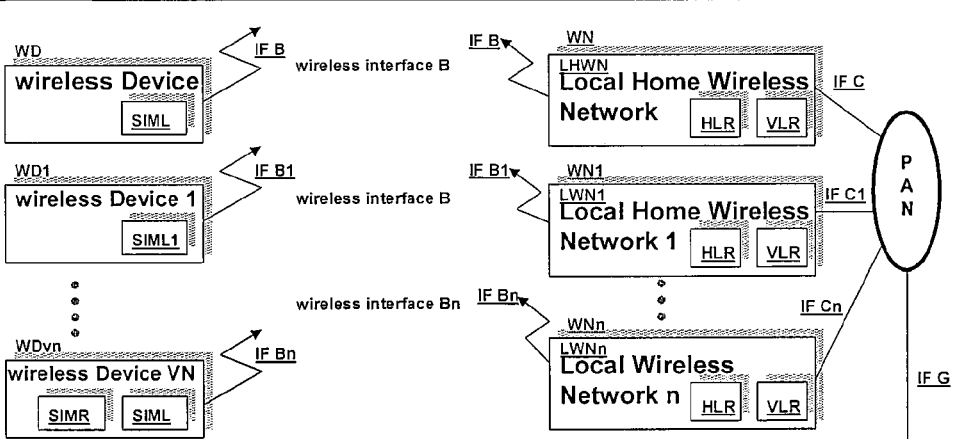
Figure 7:
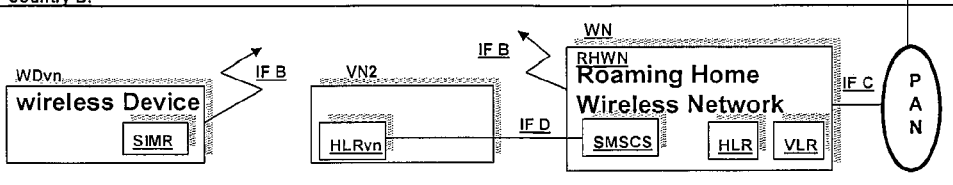
Figure 8:
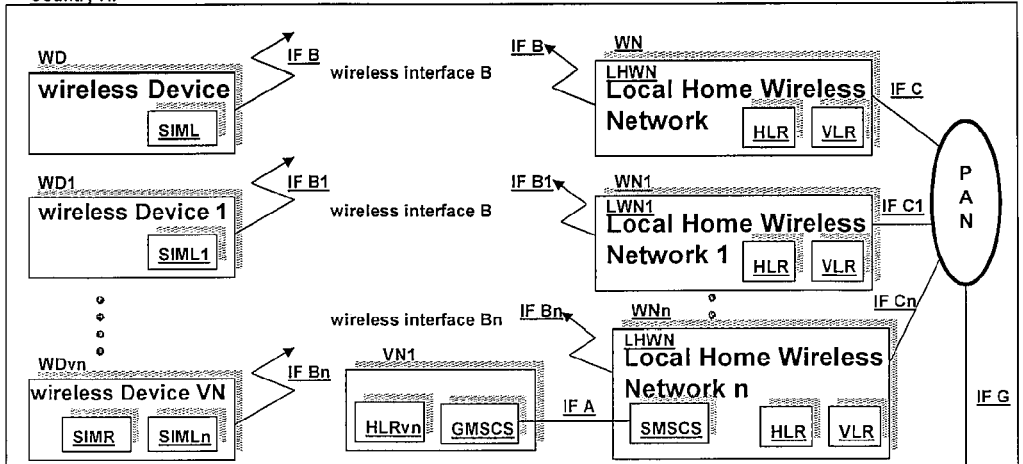
Figure 9:
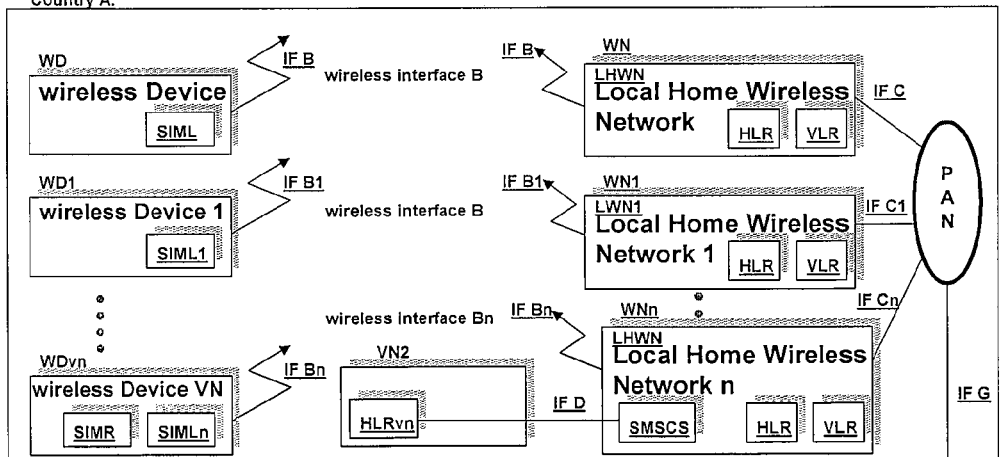
Figure 9:
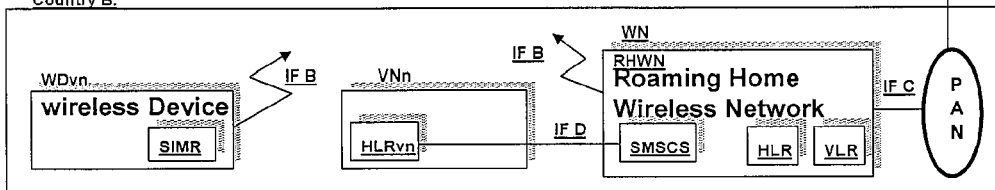
Figure 10:
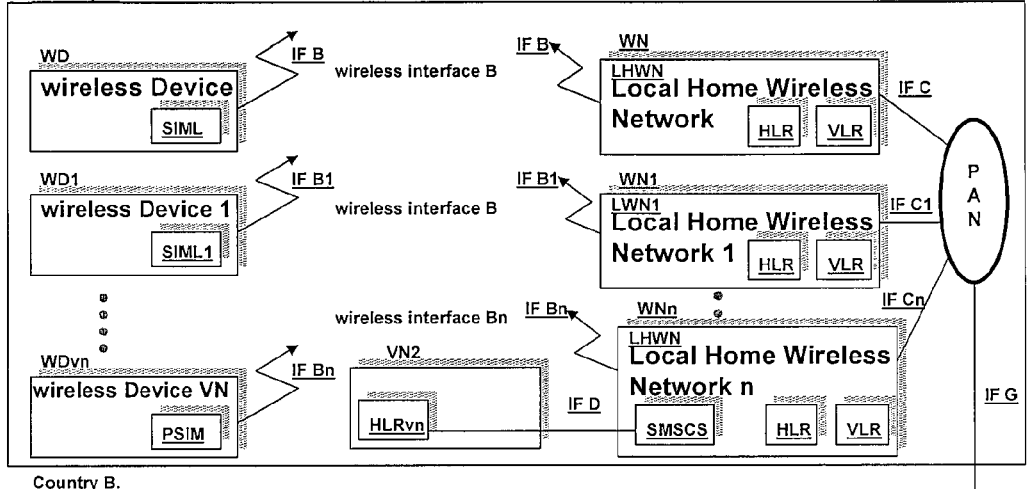
Figure 10:
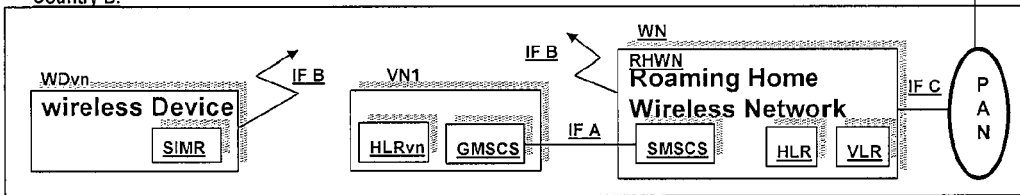

FIGS. 2 and 3 show two different preferred embodiments of the virtual wireless network architecture and interconnections and in particular the Proprietary Sub-module: Home Location Register virtual network (HLRvn). In the context of the foregoing, the drawings are self explanatory, basically showing some examples of the different combinations of the composition of a HLRvn by combining sub-modules. In particular, the proprietary application module (PSIM) of the invention as shown in FIG. 3 allows for the integration of the PSIM within a single subscriber identity module (SIM) capable of handling at least two different subscriber identities corresponding, respectively to the LS and the RS as described.

FIGS. 4 to 13, show some of the preferred integration embodiments of the Proprietary Sub-module: Home Location Register virtual network (HLRvn) within the architecture of a virtual wireless network (VN) and/or the proprietary application module (PSIM) within a wireless device (WDvn) of the invention. In the context of the foregoing, these are self explanatory, basically showing the integration of a HLRvn and/or the PSIM within a virtual wireless network and a wireless device respectively and both, within the over-all architecture, interconnected and/or communicating with one or more wireless networks WN.

Figure 14:
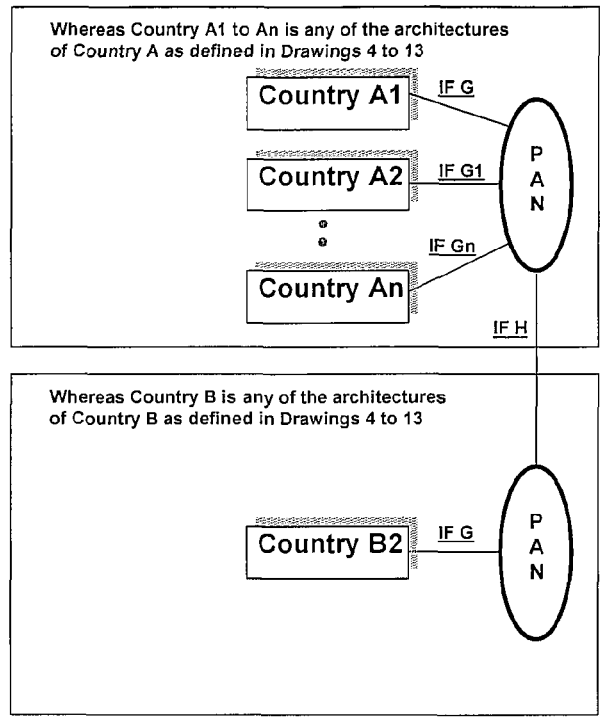
FIGS. 14 and 15 shows two example implementations of the present invention that show higher level architectures that depart from incorporating wireless virtual networks (VN) and associated wireless devices (WDvn), but are still within the different architectures of previous FIGS. 4 to 13.
Figure 15:
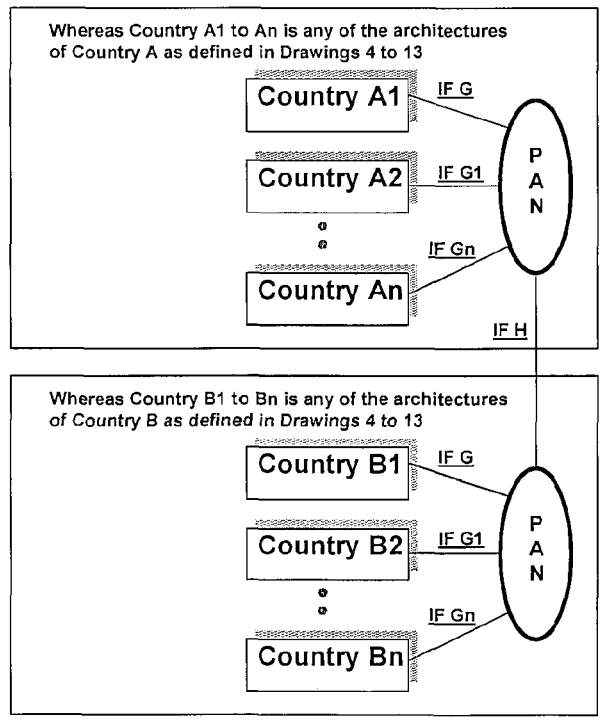

FIGS. 14 to 15 show some of the preferred integration embodiments of the invention at a macro level; the architectures and interconnections of the embodiments of the present invention as shown previously in FIGS. 4 to 14, are combined.

Figure 11:
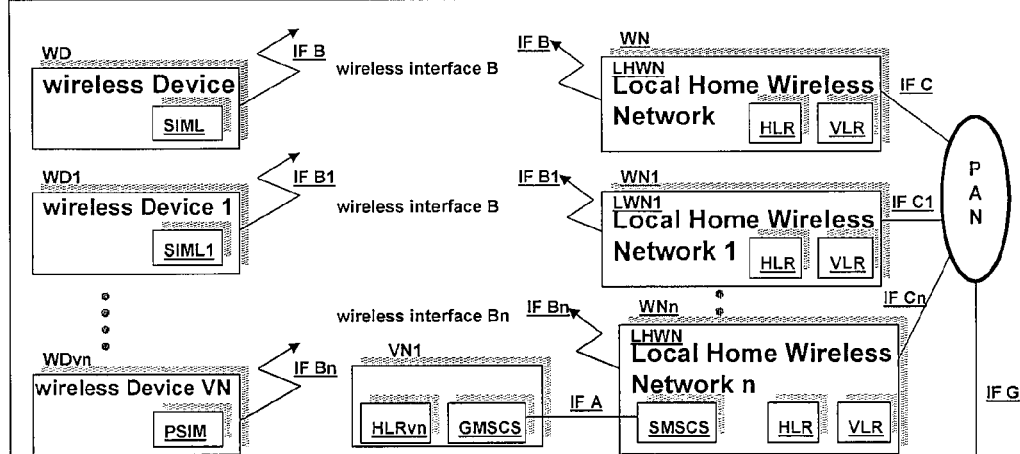
Figure 11:
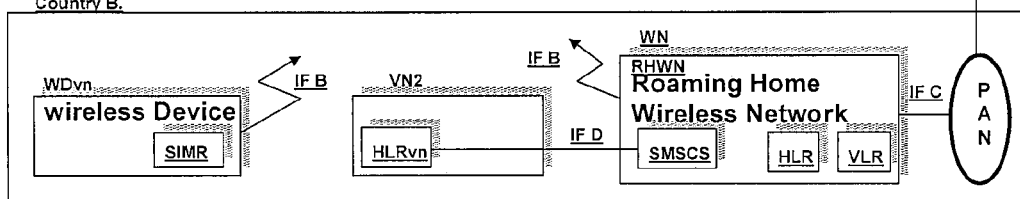
Figure 12:
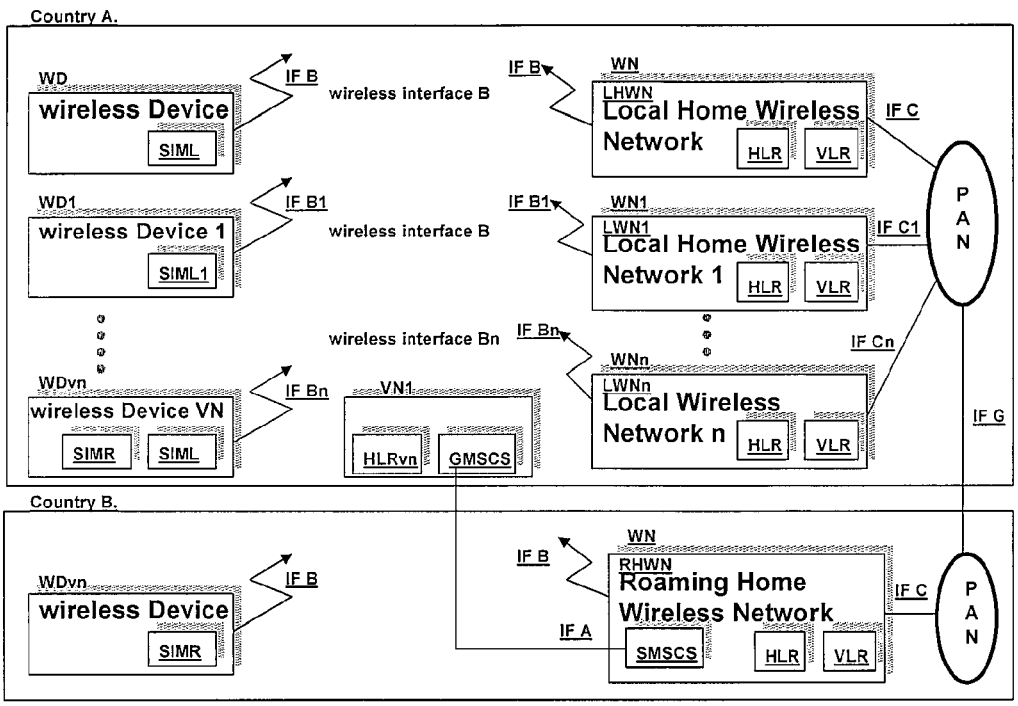
Figure 13:
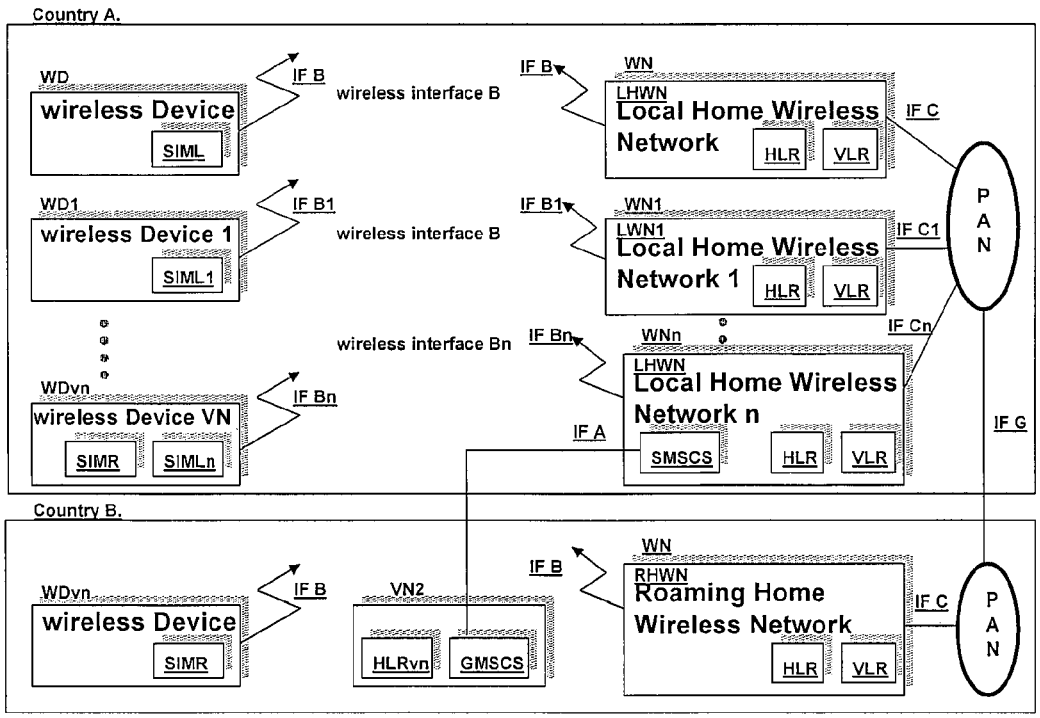

One of the preferred embodiments of the present invention and its advantages are best understood by referring to FIG. 11. Essentially, we have a method and an architecture for a virtual wireless network(s) and its interfacing and interconnecting with wireless network(s) and public access network(s) for in- and out-going, voice- and data-calls. We have also a method and apparatus for interfacing and connecting wireless devices and a virtual and non-virtual wireless network(s) for in- and out-going SMS, voice and data call routing. This interfaces and connects a handheld wireless device associated with a virtual wireless network and a wireless network; it allows for the setting up of calls in accordance with the user's own choice of routing, with any $3^{rd}$ party end user connected to wireless networks, fixed networks, servers or the internet.

The WDvn with a built-in PSIM establishes data communication, between the WDvn and a wireless network coupled to virtual wireless network VN associated with either the Local SIM (SIML) or Roaming SIM (SIMR) identities of the WDvn: the device may include two separate SIMS—for example a so-called 'ghost' SIM holder that allows two SIMs to be used in the same device. Each SIM will have a different IMSI; one will be associated with the VN; the other will be associated with a different VN, or the WN or a different WN. The choice will be a commercially driven one; in essence it is about providing the end-user with flexibility and access to lower tarriffs or charges.

An alternative implementation uses a PSIM. In the PSIM, the SIML and SIMR functions are integrated. For example, a single SIM (e.g. in the conventional single SIM package format) could include two separate SIM sub-modules, each associated with a different VN, or one associated with a VN and the other with a WN: there are many permutations; the objective is to give the end-user flexibility and lower tariffs and charges.

As a first step, the PSIM chooses a SIML and allows the WD to provide location updates to the HLRvn each time the PSIM (built into such WDvn) changes subscriber identity (SIML or SIMR) or simply each time the WDvn changes wireless network name or from wireless network country or region or state.

When the WDvn is in the home country associated with the Local SIM (SIML), the PSIM establishes data communication between the WD and a wireless network (VN). As a first step, a PAM selects the Local SIM (SIML) for location updates with its home virtual location register (HLRvn) attached to its local home wireless network (LHWN), associated with the Local SIM, each time the WD powers-on. The PAM is a module resident in the WDvn and that controls communications from the WDvn to the network; one task is to control the operation of the local SIM sub-modules SIML and SIMR. This approach allows all incoming traffic to be associated with the Local SIM when the PSIM switches from the Local SIM to the Roaming SIM for location updates with a visitor location register (VLR) attached to any of the available wireless networks (WN, WN1 or WNn), associated with such Roaming SIM. This can occur any time the WDvn user chooses manually; or optionally automatically, prior to any time the WDvn user is about to initiate outgoing traffic, such as outgoing voice and/or data calls and outgoing SMS.

This allows the WDvn to make use of any of the available local wireless networks, based in the home country of the Local SIM because the VN can route calls over any of the various wireless networks it has agreements with. Associating the WDvn with the Roaming SIM means that the WDvn outgoing traffic is at the roaming tariffs established between the virtual wireless network associated wireless network (RHWN), based in a different country than the country of the Local SIM, and each individual local wireless network (LHWN or LWN1 to LWN).

The PSIM will, after ending each originated outgoing traffic, switch towards the Local SIM for location updates with its virtual home location register (HLRvn) attached to its local home wireless network (LHWN) when the WDvn is in its Local SIM home country. The switch can be automatic or manual; the WDvn can have a built in PSIM, or can have, built in, two individual SIML and SIMR, with switching between them through an internal user menu displayed on the WDvn or an external switch on the WDvn. This allows the WDvn to receive any incoming traffic at no charge as 'calling party pays' is applied by its local home wireless network (LHWN) and its virtual home wireless network (VN1). Alternatively and optionally, there can be location updates with a visitor location register (VLR) attached to a roaming wireless network when the WDvn is in a country different from the one associated with the Local SIM, allowing the WDvn to receive any incoming traffic at the tariff rate established between its virtual home wireless network (VN1) and its associated local home wireless network (LHWN) and the roaming wireless network for such incoming roaming calls. The WDvn user always has the option to choose which sub-module of the SIM (Local SIM sub-module or Roaming SIM sub-module) or which of the at least two subscriber identities within the PSIM it will use, for any of its incoming and/or outgoing traffic.

It should be reasonably clear from the preceding disclosures that the present invention provides a method and architectures for a virtual wireless network(s) and its interfacing and interconnecting with wireless network(s) and public access network(s) for in- and out-going, voice- and data-calls. It also provides a method and apparatus of interfacing and connecting a wireless device(s) and a virtual and non-virtual wireless network(s) for in- and out-going SMS, voice and data call(s) routing.

An implementation of the invention provides an advantage allowing any wireless device (WD) with a built-in proprietary subscriber identity module (PSI and/or a virtual wireless network with a build in Proprietary Sub-module: Home Location Register virtual network (HLRvn) and any wireless network (WN) and public access network (PAN) to be interconnected through the existing wireless interfaces using any one of the at least two SIM identities, if available, such as a Local SIM (SIML) or Roaming SIM (SIMR) or the PSIM. Moreover this implementation provides an advantage allowing any wireless device WDvn, associated with the HLRvn or VN, with a built-in PSIM to choose the call routing for both in- and out-going calls.

This ability to send communications between the SIML and/or SIMR, the PSIM, a wireless device (WDvn) associated with the VN and its HLRvn, and a virtual wireless network (VN) and its associated wireless network (WNn), is particularly advantageous for data and voice calls and optionally SMS routing; currently freedom of choice by the end user is restricted. But choice is now fully in the hand of the end user of any virtual wireless network for any WDvn with a built-in PSIM.

Where the PSIM(s) resides in the wireless end-users wireless device(s) (WDvn) and/or where the HLRvn(s) would reside in the virtual wireless network(s) (VN), this could in effect allow the setting up of a market competitive "mobile virtual network" (MVNO), a "virtual telecoms operator" (VTO) or a "virtual telecoms provider (VTP), thus introducing more competition in the wireless and/or cellular market place, benefiting end-users. And this is without the need for any wireless device and/or wireless handheld user to change its current local subscriber identity number subscription (SIML), with its current home wireless network operator in the country the end-user resides in. That user can benefit from the advantages of this invention by simply embedding a PSIM into his WD or simply by subscribing to the VN, making use of the benefits as described. This allows the end-user to keep its original phone number "subscriber identity" that is:
   associated with the SIML of the corresponding local home
      wireless network (LHWN) or
   associated with the virtual network (VN1) with a built-in
      HLRvn, based in the country (Country A) where the
      end-user resides,
whilst benefiting from the advantageous tariffs whenever applicable for his originated outgoing calls:
   associated with the SIMR and the corresponding roaming
      home wireless network (RHWN) or
   associated with the virtual network (VN2) with a built-in
      HLRvn based in a different country (Country B), when the end-user of a WDvn with a built-in PSIM or with built-in LSIM and RSIM is in his home country where he resides (Country A) or even when he is in a different country then the one where he resides, traditionally referred to as roaming (meaning the SIML is roaming); in the embodiment of this invention the SIMR is almost always roaming.

The present invention is applicable with or without the PSIM, although when the PSIM is used, the benefits can be greater: the PSIM should be used wherever such inclusion is practical and beneficial commercially.

The architecture as described allows scalability: where the virtual network architecture and combinations thereof, interconnected to wireless network(s) and/or public access network(s) and/or Roaming SIMs (RS) and/or PSIM, can be the same for any country with whom the associated roaming wireless network has roaming agreements with, and where the tariffs for outgoing traffic are more advantageous in comparison with the tariffs of outgoing calls tariffs with Local SIMs in such countries.

This invention can apply partly or fully, by simply substituting in each different country, the Local SIM, as described within this invention, with the actual Local SIM (LS) identity of each individual end-user of such different countries. This invention can apply partly or fully, by simply substituting in each different country the Local SIM, as described within this invention, with the actual Local SIM (LS) identity of each individual end-user of such different countries without the use of a PSIM or two subscriber identities. This means using only one local subscriber identity (SIM) associated with the virtual network with a built-in Proprietary Home Location Register virtual network (HLRvn).

Summary of Optional Implementation Details

The following are optionally present in a preferred implementation.

An implementation provides a method for interfacing and interconnecting a virtual wireless network (VN) with a wireless network (WN) using a proprietary architecture(s) of the VN and a proprietary architecture of the interconnection between one or several proprietary VNs with one or several WNs. The VN is capable of communicating with any incoming and/or outgoing calling party and in particular communicating from and to Wireless Devices (WDvn) associated with the VN. A proprietary virtual network architecture (VN) is capable of communicating with Wireless devices (WD) through Wireless Networks (WN) and/or through Public Access Networks (PAN), through a wireless interfaces (IF-B) and/or a wired interface (IF_C) respectively.

WDvn, WD, WD1 to WDn are wireless devices and/or wireless handheld devices in any available current and future wireless technologies respectively, with at least one or more Subscriber Identity Modules (SIM) incorporated.

IF_B, IF_B1 to IF_Bn are wireless interfaces in any available current and future wireless technologies respectively.

IF_C, IF_C1 to IF_Cn and IF_G, IF_G1 to IF_Gn and IF_H are wired and/or wireless interfaces in any available current and future wireless technologies respectively.

IF_A, IF_D, IF_E, IF_F, IF_I are digital interfaces in any available current and future wireless technologies respectively.

WN, WN1 to WNn are wireless networks in any available current and future wireless technologies respectively, with at least one or more Radio Access Network (RAN) incorporated.

VN, VN1, VN2 to VNn are virtual wireless networks in any available current and future wireless and/or digital technologies respectively.

Any individual or multiple VN may be located in a different location than the WN it will interconnect and communicate with. Alternatively, it may be co-located or built-in additionally or alternatively into any WN or any such other wireless- or fixed-network.

Any individual or multiple VN may consist of all of the following sub-modules or any single or multiple combination or an equivalent of each such sub-module(s) performing a similar function within the overall method of this invention:
Proprietary Sub-module; Home Location Register virtual network (HLRvn)
Sub-module; Home Location Register (HLR)
Sub-module; Equipment Identity Register (EIR)
Sub-module; Authentication Centre (AuC)
Sub-module; Intelligent Network (IN)
Sub-module; Prepaid and optionally Postpaid services and billing Centre (PREPOS)
Sub-module; Gateway "Mobile Switching Centre" Switch (GMSCS)
Sub-module; Media Gateway (MG)

A VN is made of a GMSCS which is connected and communicates with an HLR, EIR, and AuC, through an interface IF_D, and a MG and a IN through an interface IF_E and IF_I respectively. The previous mentioned HLR is also connected and communicates with a PREPOS. The VN has two external interfaces, IF_A and IF_C, interconnected and communicating with its internal GMSCS, which interconnect and communicate with an external SMSCS of a WN and a PAN respectively.

A proprietary HLRvn is made of a HLR, EIR, and AuC, either integrated as one device or as individual devices interconnected and communicating between them, and such previous mentioned HLR is also connected and communicating with a PREPOS. The HLRvn as described in this paragraph has one external interface, IF_D, interconnected and communicating with its internal HLR, which interconnects and communicates with an external SMSCS of a WN.

A VN can be made of a single or multiple HLRvn. The VN may have one external interface, IF_D, interconnected and capable of communicating with its internal HLR, to then interconnect and communicate with an external SMSCS of a WN.

A VN can be made of a single or multiple HLRvn and a single or multiple MG. This VN can have has two external interfaces, IF_D and IF_E, interconnected and capable of communicating with an external SMSCS of a WN.

A proprietary subscriber identity module (PSIM) is capable of communicating with a Wireless Device (WD), associated with the VN, and any WN through a wireless interfaces (IF-B). Any PSIM is a subscriber identity module in any current and future subscriber identity modules technology, with built-in proprietary services associated with at least one or more VN.

Any individual or multiple PSIM integrates at least two different subscriber identity numbers, i.e. is associated with two unique and different phone numbers, each associated with a different VN. Each VN may be located within the same country or located in different countries; the two previously mentioned VN are either related or unrelated to each other.

Any individual or multiple PSIM integrates at least two different subscriber identity numbers, i.e. is associated with two unique and different phone numbers, each associated with a VN and a WN respectively. Each VN may be located within the same country or located in different countries: the VN and WN are either related or unrelated to each other.

Any individual or multiple PSIM may be built-in additionally or alternatively into any WD or any such other wireless device, such as (but not limited to) so called "handsets", "handy", "mobile phones", "cellular phones", "wireless phones", "smart phones", "wireless devices", "wireless PC cards", "wireless modules" in any available current and future wireless technologies.

The PSIM may be built into a WDvn; the PSIM at power-on selects a preset or user set default subscriber identity. Optionally, the PSIM will store in its internal temporary memory the user set Personal Identification Number (PIN) unlock code corresponding to its internal subscriber identities; each subscriber identify corresponds to a unique phone number. When the PSIM switches between its internal subscriber identities, the user does not have to enter each time the corresponding PIN except once after power-on of the WDvn and consequently power down of the PSIM. In the event this optional function is available within the PSIM, then the PSIM will at each power-on also reset the value of its internal temporary PIN memories. The WD device user has the option to manually switch between each subscriber identity manually, if available, through an internal user menu embedded in the PSIM; e.g. switch to the one specific subscriber identity when the WD is in idle mode, allowing the WD to locate update to the VN or WN with this specific identity and monitor for any incoming traffic assigned to the such specific subscriber identity. It can then switch to a different specific subscriber identity, allowing the WDvn to locate update to the VN or WN with the second subscriber identity, prior to initiating some or all of the outgoing traffic from the WDvn, assigned to the second subscriber identity. When ending any outgoing traffic, the PSIM will automatically (or alternatively by means of an embedded user menu within the PSIM, or optionally manually by the WDvn user), allow the WDvn to locate update to the VN or WN with the first mentioned subscriber identity for location updates and thus be able to receive incoming traffic and/or signalling assigned to the first subscriber identity.

The two different SIMs can be built into a WDvn. The WDvn at power-on selects a preset or user set default subscriber identity module (SIM). Optionally the WDvn will store in its internal temporary memory the user set Personal Identification Number (PIN) unlock code corresponding to its internal subscriber identities; each subscriber identify corresponds to a unique phone number, such that when the WDvn switches between its two internal subscriber identities the user does not have to enter each time the corresponding PIN except once after power-on of the WDvn and consequently power down of the SIMs. In the event this optional function is available within the WDvn, then the WDvn will at each power-on also reset the value of its internal temporary PIN memories. The WD device user has the option to manually switch between each subscriber identity module manually, if available, through an internal user menu or preset hotkey embedded in the WDvn. For example, the user can switch to the one specific subscriber identity module (SIML) when the WD is in idle mode, allowing the WD to locate update to the VN or WN with this specific subscriber identity module (SIML) and monitor for any incoming traffic assigned to the such specific subscriber identity (SIML). The user can then switch to a different specific subscriber identity module (SIMR), allowing the WDvn to locate update to the VN or WN with the second subscriber identity module (SIMR), different to the first one, prior to initiating some or all of the outgoing traffic by the WDvn assigned to such second subscriber identity module (SIMR). Thus, when ending any outgoing traffic the WDvn will automatically, (or alternatively by means of an embedded user menu within the WDvn or alternatively if available embedded in one or both subscriber identity modules (SIML and/or SIMR), or optionally manually by the WDvn user), allow the WDvn to locate update to the VN or WN with the first mentioned subscriber identity module (SIML) for location update and thus allow the WDvn to receive incoming traffic and/or signalling assigned to the first subscriber identity (SIML).

Another implementation involves a method for interfacing and interconnecting a virtual wireless network (VN) with a wireless network (WN); there is a proprietary architecture(s) of the VN and a proprietary architecture of the interconnection between one or several proprietary VN with one or several WN. The VN is capable of communicating with any incoming and/or outgoing calling party and in particular communicating from and to Wireless Devices (WDvn) with a built in PSIM associated with at least two or more VN, or alternatively communicating from and to Wireless Devices (WDvn) with a built in PSIM associated with at least one or more VN and at least one or more WN. The proprietary virtual network architecture (VN) is capable of communicating with Wireless devices (WDvn) through Wireless Networks (WN) and/or through Public Access Networks (PAN), through a wireless interfaces (IF-B) and/or a wired interface (IF_C) respectively.

WDvn, WD, WD1 to WDn are wireless devices and/or wireless handheld devices in any available current and future wireless technologies respectively, with at least one or more Subscriber Identity Modules (SIM) incorporated.

IF_B, IF_B1 to IF_Bn are wireless interfaces in any available current and future wireless technologies respectively.

IF_C, IF_C1 to IF_Cn and IF_G, IF_G1 to IF_Gn and IF_H are wired and/or wireless interfaces in any available current and future wireless technologies respectively.

IF_A IF_D, IF_E, IF_F, IF_I are digital interfaces in any available current and future wireless technologies respectively.

WN, WN1 to WNn are wireless networks in any available current and future wireless technologies respectively, with at least one or more Radio Access Network (RAN) incorporated.

VN, VN1, VN2 to VNn are virtual wireless networks in any available current and future wireless and/or digital technologies respectively.

Any individual or multiple VN may be located in a different location than the WN it will interconnect and communicate with. Alternatively it may be co-located or built-in additionally or alternatively into any WN or any such other wireless- or fixed-network.

Any individual or multiple VN may include all of the following sub-modules or any single or multiple combination thereof or an equivalent of each such sub-module(s) performing a similar function within the overall method of this invention:

Proprietary Sub-module; Home Location Register virtual network (HLRvn)
Sub-module; Home Location Register (HLR)
Sub-module; Equipment Identity Register (EIR)
Sub-module; Authentication Centre (AuC)
Sub-module; Intelligent Network (IN)
Sub-module; Prepaid and optionally Postpaid services and billing Centre (PREPOS)
Sub-module; Gateway "Mobile Switching Centre" Switch (GMSCS)
Sub-module; Media Gateway (MG)

A VN is made of a GMSCS which is connected and communicates with an HLR, EIR, and AuC, through an interface IF_D, and a MG and a IN through an interface IF_E and IF_I respectively. The previously mentioned HLR is also connected and communicates with a PREPOS. The VN can have two external interfaces, IF_A and IF_C, interconnected and communicating with its internal GMSCS, to then interconnect and communicate with an external SMSCS of a WN and a PAN respectively.

A proprietary HLRvn is made of a HLR, EIR, and AuC, either integrated as one device or as individual devices interconnected and communicating between them, and such previous mentioned HLR is also connected and communicating with a PREPOS. The HLRvn can have one external interface, IF_D, interconnected and communicating with its internal HLR, to then interconnect and communicate with an external SMSCS of a WN.

A VN can be made of a single or multiple HLRvn. This VN has one external interface, IF_D, interconnected and capable of communicating with its internal HLR, to then interconnect and communicate with an external SMSCS of a WN.

A VN can be made of a single or multiple HLRvn and a single or multiple MG. This VN has two external interface, IF_D and IF_E, interconnected and capable of communicating with an external SMSCS of a WN.

Many modifications and variations of this present invention are possible in view of the above disclosures, drawings and explanations. Thus, it is to be understood that, within the scope of the appended claims, the invention can be practiced other than as specifically described above. The invention which is intended to be protected should not, however, be construed as limited to the particular forms disclosed, or implementation examples outlined, as these are to be regarded as illustrative rather than restrictive. Variations in changes could be made by those skilled in the art without deviating from the spirit of the invention. Accordingly, the foregoing detailed descriptions and drawings should be considered exemplary in nature and not limited to the scope and spirit of the invention as set forth in the claims.

The invention claimed is:

1. A server forming part of a virtual cellular wireless network, the server including
   (i) a home location register, and
   (ii) an interface to enable the home location register to communicate with a virtual cellular wireless network operator that does not have any licensed cellular frequency spectrum, but provides cellular wireless services to a subscriber by using the cellular wireless basestations of a cellular wireless network operator that does have licensed cellular frequency spectrum, wherein the server forming part of the virtual cellular wireless network is configured to manage remotely the selection of an appropriate International Mobile Subscriber Identity ("IMSI") on a cellular wireless device with two or more IMSIs when the subscriber operates the cellular wireless device with two or more IMSIs.

2. The server of claim 1, operable to decide on the appropriate IMSI based on lowest cost call routing.

3. The server of claim 1, operable to decide on the appropriate IMSI based on features available when that IMSI is used.

4. The server of claim 1, operable such that it is the home location register that manages the remote selection of an appropriate IMSI on the device.

5. The server of claim 1, including multiple home location registers.

6. The server of claim 1, including an equipment identity register sub-module.

7. The server of claim 1, including an authentication centre sub-module.

8. The server of claim 1, including a media gateway.

9. The server of claim 1, including an interface to a public access network.

10. The server of claim 1, including a billing and services management module for pre and post paid end-users.

11. The server of claim 1, including a gateway mobile switching centre switch.

12. The server of claim 1 including an interface to enable communication with the wireless network operator.

13. The server of claim 1, including an interface to enable communication with any incoming calling party; and any outgoing calling party registered with the home location register.

14. The server of claim 1, including an interface to enable communication using one or more of the following: wireless networks public access networks; and via one or more of the following: wireless interfaces and wired interfaces.

15. The server of claim 1, adapted to receive communications from wireless devices that access the apparatus via the wireless basestations of the wireless network operator.

16. The server of claim 1, adapted to communicate with a services mobile switching centre switch operated by the wireless network operator.

17. The server of claim 16, including a gateway mobile switching centre switch adapted to communicate with the services mobile switching centre switch operated by the wireless network operator.

18. The server of claim 17 in which the gateway mobile switching centre switch communicates with the services mobile switching centre switch operated by the wireless network operator when the subscriber is in its home country.

19. The server of claim 1, operable to determine the optimal routing of a call, involving any one or more of the following: wireless networks, fixed networks, servers and the internet.

20. The server of claim 1, which allows for the setting up of calls in accordance with the subscriber's own choice of routing, with any 3rd party end user connected to wireless networks, fixed networks, servers or the internet.

21. A system comprising a server and a cellular wireless device with two or more IMSIs, the server forming part of a virtual cellular wireless network, the server including
   (i) a home location register, and
   (ii) an interface to enable the home location register to communicate with a virtual cellular wireless network operator that does not have any licensed cellular frequency spectrum, but provides cellular wireless services to a subscriber by using the cellular wireless basestations of a cellular wireless network operator that does have licensed cellular frequency spectrum, wherein the server forming part of the virtual cellular wireless network is configured to manage remotely the selection of an appropriate International Mobile Subscriber Identity (IMSI) on the cellular wireless device with two or more IMSIs when the subscriber operates the cellular wireless device with two or more IMSIs.

* * * * *